(12) United States Patent
Peterson et al.

(10) Patent No.: US 11,854,500 B2
(45) Date of Patent: Dec. 26, 2023

(54) DISPLAY BRIGHTNESS MANAGEMENT FOR LOADING CONTENT

(71) Applicant: Lenovo (Singapore) Pte. Ltd., Singapore (SG)

(72) Inventors: Nathan Peterson, Oxford, NC (US); Arnold Weksler, Raleigh, NC (US); Russell Speight VanBlon, Raleigh, NC (US); Mark Delaney, Raleigh, NC (US); John C Mese, Cary, NC (US)

(73) Assignee: LENOVO (SINGAPORE) PTE. LTD, Singapore (SG)

( * ) Notice: Subject to any disclaimer, the term of this patent is extended or adjusted under 35 U.S.C. 154(b) by 0 days.

(21) Appl. No.: 17/514,852

(22) Filed: Oct. 29, 2021

(65) Prior Publication Data
US 2023/0134813 A1  May 4, 2023

(51) Int. Cl.
*G09G 3/34* (2006.01)
*G06F 9/445* (2018.01)
*G09G 5/10* (2006.01)

(52) U.S. Cl.
CPC ........... *G09G 3/3406* (2013.01); *G06F 9/445* (2013.01); *G09G 5/10* (2013.01); *G09G 2320/0646* (2013.01)

(58) Field of Classification Search
None
See application file for complete search history.

(56) References Cited

U.S. PATENT DOCUMENTS

| | | | |
|---|---|---|---|
| 10,126,803 B1 * | 11/2018 | Cairns | G06F 1/3203 |
| 2010/0293016 A1 * | 11/2010 | Spektor | G06F 16/951 709/224 |
| 2012/0281027 A1 * | 11/2012 | Kim | G09G 3/3406 345/87 |
| 2014/0018132 A1 * | 1/2014 | Hong | H04W 52/027 455/566 |
| 2014/0168279 A1 * | 6/2014 | Huang | G09G 3/3406 345/690 |
| 2022/0159323 A1 * | 5/2022 | Ma | H04L 47/127 |

* cited by examiner

*Primary Examiner* — Kenneth Bukowski
(74) *Attorney, Agent, or Firm* — Ference & Associates LLC

(57) ABSTRACT

One embodiment provides a method, including: receiving, on an information handling device, an indication that content is loading on the information handling device; determining, using a processor, whether a projected loading period for the content is expected to exceed a predetermined threshold; and lowering, responsive to determining that the projected loading period for the content is expected to exceed the predetermined threshold, a brightness of a display screen associated with the information handling device during a loading period for the content. Other aspects are described and claimed.

18 Claims, 3 Drawing Sheets

DISPLAY BRIGHTNESS MANAGEMENT FOR LOADING CONTENT

BACKGROUND

Individuals may interact with a variety of different types of information handling devices ("devices"), for example smart phones, tablets, wearable devices, laptop and/or personal computers, hybrid devices, and the like, throughout the day. On these devices, individuals may initiate one or more different types of applications and access content thereon. For example, individuals may browse the internet on a web-browsing application, listen to music or watch videos on a media-playing application, play games on a gaming application, and the like.

BRIEF SUMMARY

In summary, one aspect provides a method, including: receiving, on an information handling device, an indication that content is loading on the information handling device; determining, using a processor, whether a projected loading period for the content is expected to exceed a predetermined threshold; and lowering, responsive to determining that the projected loading period for the content is expected to exceed the predetermined threshold, a brightness of a display screen associated with the information handling device during a loading period for the content.

Another aspect provides an information handling device, comprising: a display screen; a processor; a memory device that stores instructions executable by the processor to: receive an indication that content is loading on the information handling device; determine whether a projected loading period for the content is expected to exceed a predetermined threshold; and lower, responsive to determining that the projected loading period for the content is expected to exceed the predetermined threshold, a brightness of the display screen associated with the information handling device during a loading period for the content.

A further aspect provides a product, comprising: a storage device that stores code, the code being executable by a processor and comprising: receive an indication that content is loading; determine whether a projected loading period for the content is expected to exceed a predetermined threshold; and lower, responsive to determining that the projected loading period for the content is expected to exceed the predetermined threshold, a brightness of a display screen during a loading period for the content.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
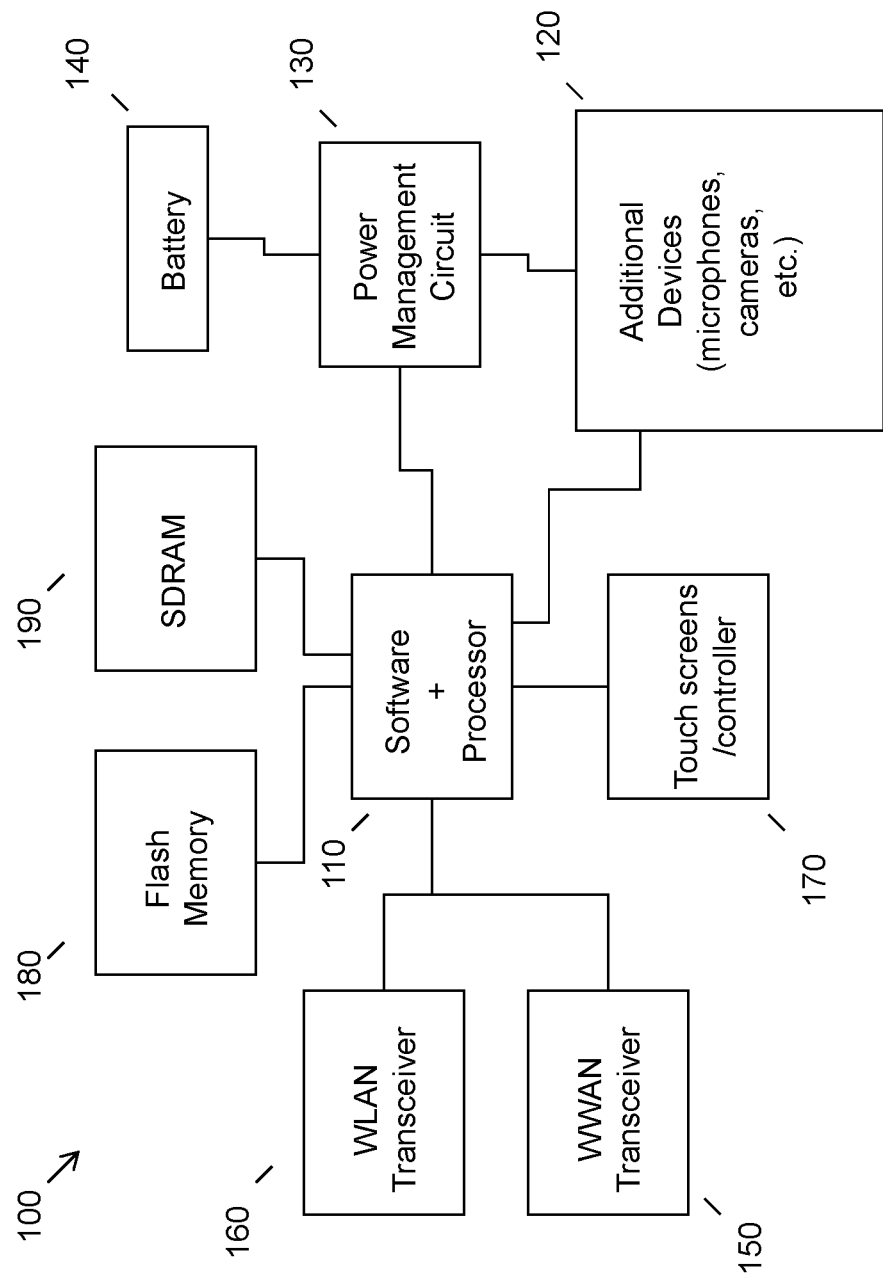
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Mobile devices have become prevalent in our society and individuals rely on these devices to perform various tasks throughout the day. Once disconnected from a power source, the battery within a mobile device gradually loses charge until it is no longer able to power the device. The rate of battery drain may be attributable to a variety of different factors (e.g., frequency of device use, number of active applications, etc.), however, the largest power consumer on most devices today is the display screen. Accordingly, reducing the power consumption of the display in any way will help the battery life of all devices.

Solutions exist today that can modulate the brightness of the display screen based upon various contextual factors. For example, displays can dynamically brighten or dim based on the presence or absence of ambient light. In another example, screen timers may be utilized to turn off the display after a predetermined amount of inactivity has been detected. In yet another example, likely idle periods within applications may be projected and identified as times during which to dim the display (e.g., in GPS software the screen can be configured to dim between turns during long straight drives, etc.). Although all of the foregoing solutions manage display power consumption in some way, additional power management techniques, not conventionally utilized, may also be implemented to further preserve battery power by managing the activity of the display.

Accordingly, an embodiment provides a method for lowering the brightness of a display screen during loading and/or initiation periods for applications. In an embodiment, an indication may be received at a device that content is loading. The content may be an application being initiated or data loading within an application. An embodiment may then determine whether a projected loading period for the content is expected to exceed a predetermined threshold (e.g., 5 seconds, 30 seconds, 1 minute, etc.). Responsive to determining that the projected loading period is expected to exceed the predetermined threshold, an embodiment may dynamically adjust the brightness of the display screen during the loading period. For instance, an embodiment may dim or turn off the display screen during the loading period. Such a method may preserve the battery power of the device by reducing the power consumption of the display during one or more idle periods while content is loading.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, audio capture device such as a microphone, etc. System 100 often includes one or more touch screens 170 for data input and display/rendering. System 100 also typically includes various memory devices, for example flash memory 180 and SDRAM 190.

Figure 2:
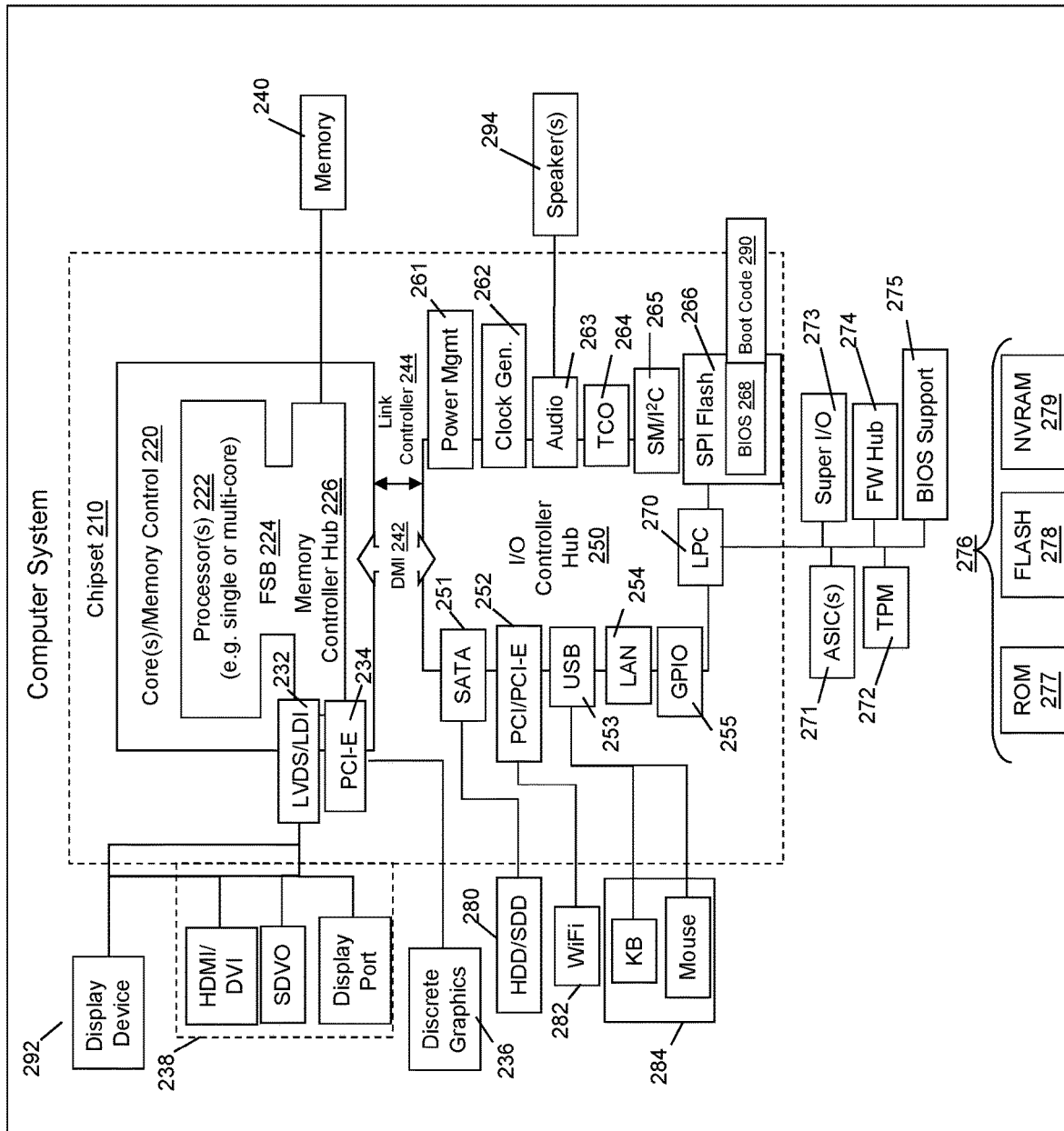
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, NC, or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling circuitry, as for example outlined in FIG. 1 or FIG. 2, may be used in computing devices having a display and that are capable of initiating applications and loading content thereon. For example, the circuitry outlined in FIG. 1 may be implemented in a smart phone, whereas the circuitry outlined in FIG. 2 may be implemented into a laptop or personal computer.

Figure 3:
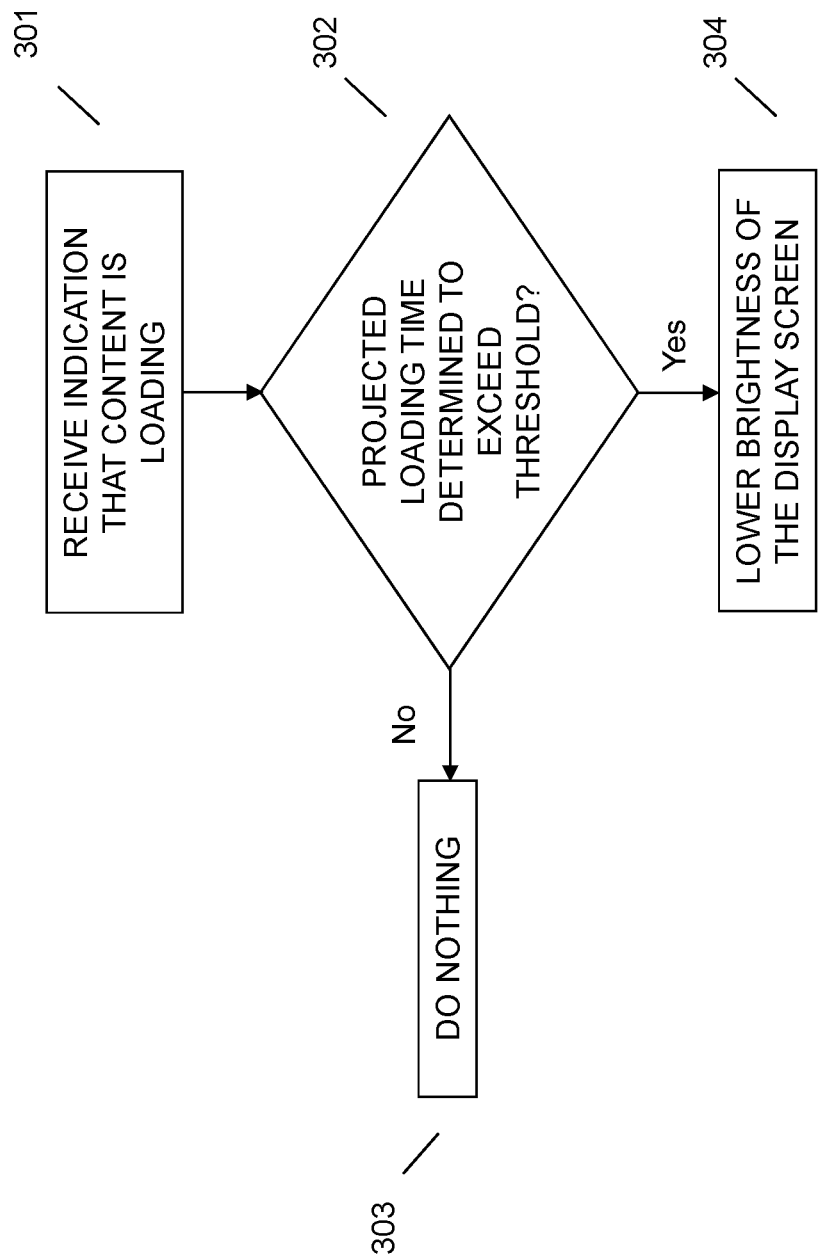
FIG. 3 illustrates an example method of lowering the brightness of a display screen while content is lowering.

Referring now to FIG. 3, an embodiment provides a method of lowering the brightness of a display screen. At 301, an embodiment may receive an indication that content is loading on a device. In the context of this application, loading content may refer to one or more of: the initiation of an application (e.g., a media-playing application, a content-editing application, a gaming application, etc.), the loading of data within an application (e.g., a document or file, a song or video, a map or stage within a game, etc.), the loading of a website on an internet browser, the loading of content within a web site (e.g., an image, a video, another type of media content, etc.), and the like. In an embodiment, the indication may correspond to the detection that one of the foregoing events is occurring or has occurred At 302, an embodiment may determine whether a projected loading period for a content type is expected to exceed a predetermined threshold. Responsive to determining, at 302, that the projected loading period for the content type is not expected to exceed the predetermined threshold, an embodiment may, at 303, take no additional action. More particularly, an embodiment may proceed to load the content using conventional means. Conversely, responsive to determining, at 302, that the projected loading period for the content type is expected to exceed the predetermined threshold, an embodiment may, at 304, perform a power management function on the device, as further described below.

In an embodiment, the predetermined threshold may be a "zero-time" threshold. Stated differently, an embodiment may perform the power management function whenever the system detects that content is being loaded. Alternatively, the predetermined threshold may correspond to a time period (e.g., 1 second, 5 seconds, 30 seconds, etc.) in which an embodiment may only perform the power management function for content projected to require a greater amount of time to load than the predetermined threshold time. Content projected to load within the predetermined threshold time may load using conventional means. In an embodiment, the predetermined threshold may be originally designated by a manufacturer of the device and/or may later be adjusted by a user (e.g., via a setting adjustment menu, etc.).

In an embodiment, all content may be subject to the same predetermined threshold time. For example, the initiation of a gaming application may be subject to the same threshold loading time as the loading of a video on a website. Alternatively, multiple predetermined thresholds may exist for different types of content. For example, a gaming application may be associated with a first predetermined threshold time (e.g., 5 seconds, etc.) whereas a video on a website may be associated with a second predetermined threshold time (e.g., 2 seconds, etc.). Additionally or alternatively, a user may designate a predetermined threshold for an entire class of content or type of content. For example, all application initiation events may be associated with a first predetermined threshold time, all content loading events within an application may be associated with a second predetermined threshold time, all content loading events within a web browser may be associated with a third predetermined threshold time, and the like.

In an embodiment, the determination at Step 302 may be facilitated in one or more ways. For example, an embodiment may first access a database (e.g., stored locally on the device, stored remotely on another device or server, etc.) containing the predetermined threshold time or times (i.e., in situations where different content types have different designated threshold times). An embodiment may then access the same or different database that contains indications of the projected loading time for the content or content type. Thereafter, an embodiment may compare these two metrics to determine whether the projected loading time will exceed the threshold loading time. Responsive to determining that the projected loading time will exceed the threshold loading time, an embodiment may perform the power management function.

In an embodiment, the projected loading times may be explicitly designated by a manufacturer or user. Alternatively, in another embodiment, the projected loading times may be accessed from a crowdsourced database (i.e., which contains the actual loading times for like content across a plurality of devices sharing similar characteristics with the user's device (e.g., where the plurality of devices: are of the same brand as the user's device, have the same or similar processing capabilities as the user's device, etc.)). Additionally or alternatively, in yet another embodiment, the projected loading times may be deduced by the system dynamically (e.g., via examining and averaging the historical loading times for the relevant content on the user's device, etc.).

In an embodiment, a system may dynamically implement a power management function for content that was originally projected to load within the predetermined loading time but does not. For example, a predetermined loading threshold may be set at 5 seconds and a particular piece of content may be projected to load within 2 seconds. In such a situation, an embodiment may not immediately implement a power management function while the content is loading. However, if the piece of content takes over 5 seconds to load, then an embodiment may implement the power management function until the content has completed loading.

In an embodiment, the power management function may be a brightness lowering function of the display. Such a function may be implemented automatically (i.e., without additional user input) and may correspond to either a turning off of the display or a dimming of the display while the content is loading. Regarding the latter, an embodiment may dim the display by a predetermined amount (e.g., a predetermined amount of nits, by a factor that still enables a user to view content presented on the display in a dimmed fashion, etc.). Additionally or alternatively, an embodiment may dim the display by the predetermined amount instantaneously or gradually (e.g., over the course of 3 seconds, etc.). In an embodiment, once content is loaded or initiated the display may return to its original brightness setting. More particularly, if a display was turned off or dimmed, the display may be automatically reactivated or brightened.

In an embodiment, prior to or in conjunction with the brightness lowering function, an embodiment may provide an indication of the power conservation function to the user. This notification may be provided using one or more notification techniques. For instance, the notification may be a visual notification (e.g., a predetermined number of blinks of the display screen or a sensor positioned around a bezel of the display, a change to or a flashing of a particular color on the display, a push notification that indicates that the screen will dim and/or why the screen is dimming, etc.), an audible notification provided using one or more speakers integrally or operatively coupled to the device (e.g., a predetermined number of beeps or sounds, an audible notification that the screen is dimming and/or an explanation regarding why the screen is dimming, etc.), a haptic notification (e.g., a vibration pattern provided by one or more actuators integrated within the device, etc.), any combination of the foregoing, and the like.

The various embodiments described herein thus represent a technical improvement to conventional methods for conserving device power. Using the techniques described herein, an embodiment may receive an indication that content is loading on a device. An embodiment may then determine whether a projected loading period for the article of content is expected to exceed a predetermined threshold. Responsive to determining that it will, an embodiment may dynamically implement a power conservation function. For example, an embodiment may automatically turn off or dim a display of the device during a content loading duration. Such a technique may lower the amount of power consumed by the display screen and may correspondingly prolong the usage of the mobile device between charges.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   receiving, on an information handling device, an indication that content is loading on the information handling device;
   determining, using a processor, whether a projected loading period for the content is expected to exceed a predetermined threshold, wherein the determining comprises:
      identifying a content type associated with the content, wherein the identifying the content type comprises identifying a class of content for the content type and a predetermined threshold of time for loading content associated with the class of content;
      accessing a database comprising average loading times associated with each class of content for a plurality of content types;
      identifying the projected loading period of the content; and
      comparing the average loading time for the class of content associated with the content type to the projected loading period of the content; and
   lowering, responsive to determining that the projected loading period for the content is expected to exceed the predetermined threshold, a brightness of a display screen associated with the information handling device during a loading period for the content.

2. The method of claim 1, wherein the receiving the indication comprises identifying that a webpage is loading.

3. The method of claim 1, wherein the receiving the indication comprises identifying that an application is loading.

4. The method of claim 1, wherein the receiving the indication comprises identifying that data is loading within an application or a web site.

5. The method of claim 1, wherein the lowering comprises lowering the brightness of the display screen by a predetermined amount during the loading period.

6. The method of claim 1, wherein the lowering comprises deactivating the display screen during the loading period.

7. The method of claim 1, wherein the lowering comprises gradually lowering the brightness of the display screen.

8. The method of claim 1, wherein the lowering comprises providing, to a user of the information handling device, a visual indication of the lowering.

9. The method of claim 1, further comprising increasing, after the loading period is complete, the brightness of the display screen.

10. An information handling device, comprising:
    a display screen;
    a processor;
    a memory device that stores instructions executable by the processor to:
       receive an indication that content is loading on the information handling device;

determine whether a projected loading period for the content is expected to exceed a predetermined threshold, wherein to determine comprises:
identifying a content type associated with the content, wherein the identifying the content type comprises identifying a class of content for the content type and a predetermined threshold of time for loading content associated with the class of content;
accessing a database comprising average loading times associated with each class of content for a plurality of content types;
identifying the projected loading period of the content; and
comparing the average loading time for the class of content associated with the content type to the projected loading period of the content and lower, responsive to determining that the projected loading period for the content is expected to exceed the predetermined threshold, a brightness of the display screen associated with the information handling device during a loading period for the content.

11. The information handling device of claim 10, wherein the instructions executable by the processor to receive the indication comprise instructions executable by the processor to identify that a webpage is loading.

12. The information handling device of claim 10, wherein the instructions executable by the processor to receive the indication comprise instructions executable by the processor to identify that an application is loading.

13. The information handling device of claim 10, wherein the instructions executable by the processor to receive the indication comprise instructions executable by the processor to identify that data is loading within an application or a website.

14. The information handling device of claim 10, wherein the instructions executable by the processor to lower comprise instructions executable by the processor to lower the brightness of the display screen by a predetermined amount during the loading period.

15. The information handling device of claim 10, wherein the instructions executable by the processor to lower comprise instructions executable by the processor to deactivate the display screen during the loading period.

16. The information handling device of claim 10, wherein the instructions executable by the processor to lower comprise instructions executable by the processor to provide, to a user of the information handling device, a visual indication of the lowering.

17. The information handling device of claim 10, wherein the instructions are further executable by the processor to increase, after the loading period is complete, the brightness of the display screen.

18. A product, comprising:
a non-transitory storage device that stores code, the code being executable by a processor and comprising:
receive an indication that content is loading;
determine whether a projected loading period for the content is expected to exceed a predetermined threshold, wherein to determine comprises:
identifying a content type associated with the content, wherein the identifying the content type comprises identifying a class of content for the content type and a predetermined threshold of time for loading content associated with the class of content;
accessing a database comprising average loading times associated with each class of content for a plurality of content types;
identifying the projected loading period of the content; and
comparing the average loading time for the class of content associated with the content type to the projected loading period of the content; and
lower, responsive to determining that the projected loading period for the content is expected to exceed the predetermined threshold, a brightness of a display screen during a loading period for the content.

\* \* \* \* \*